United States Patent
Rikihisa et al.

(10) Patent No.: US 7,632,388 B2
(45) Date of Patent: Dec. 15, 2009

(54) LIQUID ACTUATOR

(75) Inventors: Hiroaki Rikihisa, Tokyo (JP); Tetsuya Hamaguchi, Tokyo (JP); Takeshi Ooi, Hiratsuka (JP)

(73) Assignees: The Furukawa Electric Co., Ltd., Tokyo (JP); The University of Tokyo, Tokyo (JP)

( * ) Notice: Subject to any disclaimer, the term of this patent is extended or adjusted under 35 U.S.C. 154(b) by 243 days.

(21) Appl. No.: 11/907,490

(22) Filed: Oct. 12, 2007

(65) Prior Publication Data
US 2008/0098917 A1     May 1, 2008

Related U.S. Application Data

(63) Continuation of application No. PCT/JP2006/306705, filed on Mar. 30, 2006.

(30) Foreign Application Priority Data

Apr. 12, 2005     (JP) ............................... 2005-115165

(51) Int. Cl.
*G01N 27/453*     (2006.01)
(52) U.S. Cl. ...................... 204/600; 204/601
(58) Field of Classification Search ................. 204/450, 204/600
See application file for complete search history.

(56) References Cited

U.S. PATENT DOCUMENTS 7,163,612 B2 *    1/2007    Sterling et al. .............. 204/600

FOREIGN PATENT DOCUMENTS

| JP | 45-34910 B | 11/1970 |
|---|---|---|
| JP | 46-23605 B | 7/1971 |
| JP | 06-323244 A | 11/1994 |
| JP | 11-090217 A | 4/1999 |
| JP | 2000-119551 A | 4/2000 |
| JP | 2001-347218 A | 12/2001 |
| JP | 2003-112031 A | 4/2003 |
| JP | 2003-155357 A | 5/2003 |
| JP | 2003-525737 A | 9/2003 |
| JP | 2004-342480 A | 12/2004 |
| WO | WO-2004/030820 A2 | 4/2004 |

OTHER PUBLICATIONS

Cho et al. Journal of Microelectromechanical Systems, vol. 12, No. 1, Feb. 2003 pp. 70-80 Cho et al.
Internet page searched on Apr. 8, 2005 (HTTP://WWW.CELLSEED.COM/TECHNOLOGY.HTML ).

* cited by examiner

*Primary Examiner*—Alex Noguerola
(74) *Attorney, Agent, or Firm*—Birch, Stewart, Kolasch & Birch, LLP (57) ABSTRACT

A liquid actuator, which contains: an electrolyte layer (14, 114) containing a liquid, two or more electrically separated electrode parts (13a, 13b, 113a, 113b) on one or both sides of the electrolyte layer, and a water-repellent layer (12, 112) having a porous structure on an outside surface of at least one of the electrode parts, in which the electrolyte layer (14, 114), the electrode parts (13a, 13b, 113a, 113b), and the water-repellent layer (12, 112) form a structural body, wherein voltage is applied across the plural electrode parts (13a, 113a) including the one provided with the water-repellent layer (12, 112), and the applied voltage is adjusted to change the superficial wettability of the structural body.

38 Claims, 3 Drawing Sheets

LIQUID ACTUATOR

This application is a Continuation of copending PCT International Application No. PCT/JP2006/306705 filed on Mar. 30, 2006, which designated the United States, and on which priority is claimed under 35 U.S.C. § 120. This application also claims priority under 35 U.S.C. § 119(a) on Patent Application No(s). 2005-115165 filed in Japan on Apr. 12, 2005. The entire contents of each of the above documents is hereby incorporated by reference.

TECHNICAL FIELD

The present invention relates to a liquid actuator. In particular, the present invention relates to a liquid actuator that controls the superficial wettability of a structural body, and to a liquid actuator that controls the fluidity of a liquid droplet formed on the surface of the structural body. The present invention also relates to a liquid actuator for mixing of a liquid, distributing a liquid, increasing or decreasing a liquid amount, forming a liquid, and controlling them.

BACKGROUND ART

In recent years, necessity has been increased for developing technology to adjust and control the hydrophilic or hydrophobic properties of the surface of a material, for accommodating them to applications and objects. For example, such a technology is required in a field of a cell array as one of bio-chip technique. In the field, matrix-like microregions are arranged on a glass substrate for cultivating cells and screening a chemical solution therein. In this treatment, in order to accomplish a lot of screenings in a smaller space, it is necessary to form these micro-media as an array in a pattern having hydrophilic portions and hydrophobic portions for being independent microregions on the surface of the substrate. Further, the bio-chip is progressively applied to genome analysis, food inspection, and tailor-made medicines, and thus controlling the superficial wettability applicable to various things is demanded, but not limited to those for the fixing of a cell solution. Moreover, studies of micro-TAS, micro-reactors, lab-on-a-chips, and the like have been progressed, and accordingly technology is demanded for controlling the fluidities of various kinds of liquid to satisfy the requirement in miniaturization of devices for the above-described purpose.

In order to impart hydrophilic or hydrophobic properties to the surface of a substrate or the like, methods of coating a hydrophilic or hydrophobic agent have been adopted so far. However, in these methods, the property of the surface cannot be changed dynamically (retroactively and reversibly). The property depends basically on the coating agent, and therefore it is limited to either of hydrophilic and hydrophobic properties.

To solve the above described problems, a trial is made to control the superficial wettability of a substrate or the like, more functionally. For example, it is proposed to change the superficial wettability by applying light or electrons to the surface (see Patent Documents 1 to 3). Further, it is proposed that a method controls the wettability by oscillation (see Patent Document 4).

Besides, Non Patent Document 1 discloses a method of applying voltage to a liquid to change the surface tension thereof. However, in this method, it is necessary to apply voltage to the liquid continuously for maintaining wettability, and the output should be varied depending on the kind of liquid and the dissolved material. Further, in the case that plural liquids are handled in a single device, contaminations are concerned due to excess liquids passing through the same passage, and therefore such a method can not be adopted. Moreover, Non Patent Document 2 discloses a method of using a polymer which can be deformed by heating to change its wettability.

[Patent Document 1] JP-A-11-90217 ("JP-A" means unexamined published Japanese patent application)
[Patent Document 2] JP-A-2003-155357
[Patent Document 3] JP-A-2000-119551
[Patent Document 4] JP-A-2001-347218
[Non Patent Document 1] Journal of Microelectromechanical System, Vol. 12, No. 1, 2003
[Non Patent Document 2] Searched on Apr. 8, 2005, (Heisei 17), Internet <URL:http://www.cellseed.com/technology.html>

DISCLOSURE OF INVENTION

Problem which the Invention is to Solve

The present invention provides a liquid actuator capable of changing and controlling, depending on its requirement, the superficial wettability of a structural body such as a substrate. Further, the present invention provides a liquid actuator which controls the fluidity of a liquid such as a droplet on the surface of a structural body. Moreover, the present invention provides a liquid actuator which controls the superficial wettability, liquid fluidity, formation of a liquid droplet, mixing of liquids or liquid droplets, increase or decrease of a liquid amount, or distribution of a liquid. The present invention also provides a liquid actuator which controls the above-described things independently in microregions without requiring any extra mechanism.

Means to Solve the Problem

According to the present invention, there is provided the following means:

(1) A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body, wherein voltage is applied across the plural electrode parts including the one provided with the water-repellent layer, and the applied voltage is adjusted to change the superficial wettability of the structural body.

(2) The liquid actuator according to Item (1), wherein one or more of the electrode parts are disposed on each side of the electrolyte layer, and voltage is applied across the electrode parts on both sides.

(3) The liquid actuator according to Item (1), wherein the two or more of the electrode parts separated from each other are disposed on one side of the electrolyte layer, and voltage is applied across the electrode parts separated on the one side.

(4) The liquid actuator according to any one of Items (1) to (3), wherein, in accordance with adjustment of the voltage applied across the electrodes, the liquid contained in the structural body is permeated and exuded to the surface of the water-repellent layer to increase the superficial wettability of the structural body, or a liquid on the surface of the water-repellent layer is permeated and absorbed into the inside of the structural body to decrease the superficial wettability of the structural body.

(5) The liquid actuator according to any one of Items (1) to (4), wherein, in accordance with adjustment of the voltage applied across the electrodes, a liquid in the vicinity of the electrode part is electrolyzed to generate gas, and the generated gas is brought to the surface of the water-repellent layer to decrease the superficial wettability of the structural body.

(6) The liquid actuator according to any one of Items (1) to (5), wherein the superficial wettability of the water-repellent layer of the structural body is changed reversibly.

(7) The liquid actuator according to Item (5) or (6), wherein an amount of the exuded liquid or absorbed liquid on the surface of the above water-repellent layer is increased or decreased in accordance with the voltage applied across the electrodes adjusted in a range of from −1.229 to 1.229 V, or an amount of the gas brought to the surface of the water-repellent layer is increased or decreased in accordance with the voltage applied across the electrodes in a range less than −1.229 V or exceeding 1.229 V; thereby the superficial wettability of the structural body is changed.

(8) The liquid actuator according to any one of Items (1) to (7), wherein the electrolyte is an organic electrolyte, an inorganic electrolyte, or an electrolyte of combination thereof.

(9) The liquid actuator according to any one of Items (1) to (8), wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

(10) The liquid actuator according to any one of Items (1) to (9), wherein the water-repellent layer contains at least one water-repellent agent selected from the group consisting of a paraffin-type water-repellent agent, a fluorine-containing water-repellent agent, and a silicon-type water-repellent agent.

(11) The liquid actuator according to any one of Items (1) to (10), wherein the electrode part is formed of gold, platinum, copper, carbon, or a combination thereof.

(12) The liquid actuator according to any one of Items (1) to (11), wherein a liquid-preservation layer is disposed on the electrolyte layer at the side opposite to the water-repellent layer.

(13) The liquid actuator according to any one of Items (1) to (12), wherein a contact angle of a droplet formed on the surface of the water-repellent layer is changed in a range from 90° to 150°.

(14) A liquid flow control actuator using the liquid actuator according to any one of Items (1) to (13), comprising: a liquid passage, and the liquid actuator provided in the manner that the water-repellent layer faces the inside of the liquid passage, wherein, in accordance with the voltage applied across the electrode parts, the superficial wettability of the structural body is decreased for preventing a liquid from intruding to shut the liquid flow in the passage, or said superficial wettability is increased to release the liquid flow.

(15) The liquid flow control actuator according to Item (14), wherein the passage is a cylindrical passage or grooved passage.

(16) A liquid formation control actuator, comprising the liquid actuator according to any one of Items (1) to (13),
wherein two or more of the liquid actuator are provided independently, and the superficial wettability of the water-repellent layer is independently changed in the each region provided with the liquid actuator; or
the electrode part of the liquid actuator is divided into plural regions with the water-repellent layer formed on the plurality divided electrode parts, and the superficial wettability of the water-repellent layers is independently changed in the each divided region; and thereby
a predetermined amount of the liquid is aggregated in a predetermined region.

(17) A liquid distribution control actuator comprising the liquid formation control actuator according to Item (16), wherein the regions are disposed so as to be independently controllable.

(18) A liquid distribution control actuator comprising the liquid formation control actuator according to Item (16), wherein the liquid formation control actuators are disposed in a predetermined arrangement on a substrate.

(19) A liquid distribution control actuator comprising the liquid formation control actuator according to Item (16), wherein a liquid is formed in a predetermined regional distribution by using the liquid formation control actuator.

(20) A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body,
wherein voltage is applied across the plural electrode parts including the one provided with the water-repellent layer, and the applied voltage is adjusted to change a liquid amount on the surface of the structural body.

(21) The liquid actuator according to Item (20), wherein, in accordance with adjustment of the voltage applied across the electrodes, the liquid contained in the structural body is permeated and exuded to the surface of the water-repellent layer to increase the liquid amount on the surface of the structural body, or a liquid on the surface of the water-repellent layer is permeated and absorbed to decrease the liquid amount on the surface of the structural body.

(22) The liquid actuator according to Item (20) or (21), wherein, in accordance with adjustment of the voltage applied across the electrodes, a liquid in the vicinity of the electrode part is electrolyzed to generate gas, and the generated gas is vaporized to decrease the liquid amount on the surface of the structural body.

(23) The liquid actuator according to any one of Items (20) to (22), wherein the liquid amount on the surface of the structural body is increased or decreased reversibly.

(24) The liquid actuator according to any one of Items (20) to (23), wherein the electrolyte is an organic electrolyte, an inorganic electrolyte, or an electrolyte of combination thereof.

(25) The liquid actuator according to any one of Items (20) to (24), wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

(26) The liquid actuator according to any one of Items (20) to (25), wherein the water-repellent layer contains at least one water-repellent agent selected from the group consisting of a paraffin-type water-repellent agent, a fluorine-containing water-repellent agent, and a silicon-type water-repellent agent.

(27) The liquid actuator according to any one of Items (20) to (26), wherein the electrode part is formed of gold, platinum, copper, carbon, or a combination thereof.

(28) A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body, wherein voltage is applied across the plural electrode parts including the one provided with the water-repellent layer, and the applied voltage is adjusted to change a fluidity of a liquid formed on the surface of the structural body.

(29) The liquid actuator according to Item (28), wherein, in accordance with adjustment of the voltage applied across the electrodes, the liquid contained in the structural body is permeated and exuded to the surface of the water-repellent layer to non-fluidize the liquid formed on the surface of the structural body, or a liquid on the surface of the water-repellent layer is permeated and absorbed to fluidize the liquid formed on the surface of the structural body.

(30) The liquid actuator according to Item (28) or (29), wherein, in accordance with adjustment of the voltage applied across the electrodes, a liquid in the vicinity of the electrode part is electrolyzed to generate gas, and the generated gas is brought to the surface of the water-repellent layer to raise and fluidize the liquid formed on the surface of the structural body by a pressure of the gas.

(31) The liquid actuator according to any one of Items (28) to (30), wherein the fluidity of the liquid is changed reversibly.

(32) The liquid actuator according to any one of Items (28) to (31), wherein the electrolyte is an organic electrolyte, an inorganic electrolyte, or an electrolyte of combination thereof.

(33) The liquid actuator according to any one of Items (28) to (32), wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

(34) The liquid actuator according to any one of Items (28) to (33), wherein the water-repellent layer contains at least one water-repellent agent selected from the group consisting of a paraffin-type water-repellent agent, a fluorine-containing water-repellent agent, and a silicon-type water-repellent agent.

(35) The liquid actuator according to any one of Items (28) to (34), wherein the electrode part is formed of gold, platinum, copper, carbon, or a combination thereof.

(36) The liquid actuator according to any one of Items (28) to (35), wherein the contact angle of a droplet formed on the surface of the water-repellent layer is changed in a range from 90° to 150°, to control the fluidity of the liquid.

(37) A liquid droplet-mixing actuator using the liquid actuator according to any one of Items (28) to (36), wherein plural liquid droplets, which are non-fluidized on the surface of the structural body by applying voltage, are fluidized by adjusting voltage, to allow these liquid droplets to bring into contact with and mix each other.

(38) The liquid droplet-mixing actuator according to Item (37), wherein the liquid droplets are supplied from the outside of the actuator and formed.

(39) The liquid actuator according to Item (1), wherein the water-repellent layer has water permeability.

(40) The liquid actuator according to Item (20), wherein the water-repellent layer has water permeability.

(41) The liquid actuator according to Item (28), wherein the water-repellent layer has water permeability.

EFFECTS OF THE INVENTION

The liquid actuator of the present invention enables to change and control the superficial wettability of a structural body such as a substrate reversibly depending on requirement. Further, the liquid actuator of the present invention enables to control a liquid droplet or the like on the surface of a structural body, fluidization and non-fluidization of a liquid reversibly. Moreover, the liquid actuator of the present invention enables to control the superficial wettability and the fluidity of a droplet, and can attain distribution of a liquid, mixing of liquid droplets, increase or decrease of a liquid amount, and formation of a liquid or a liquid droplet in microregions; with high accuracy.

Other and further features and advantages of the invention will appear more fully from the following description, taken in connection with the accompanying drawings.

BRIEF DESCRIPTION OF DRAWINGS

FIG. 1-1 is a sectional view schematically showing an embodiment of the liquid actuator of the present invention.

FIG. 1-2 is a sectional view schematically showing another embodiment of the liquid actuator of the present invention.

FIG. 2 is an enlarged partial sectional view schematically showing an embodiment of the liquid actuator of the present invention, for schematically explaining the mechanism of reversible transition, in which FIG. 2(a) shows the state of the liquid actuator when negative voltage is applied to the water-repellent layer side, and FIG. 2(b) shows the state of the liquid actuator when positive voltage is applied to the water-repellent layer side.

FIG. 3 is an explanatory view schematically showing an embodiment of the liquid droplet mixing actuator of the present invention, in which FIG. 3(a) is a front view schematically showing the state that two liquid droplets are formed and fixed, FIG. 3(b) is a plan view showing that state, FIG. 3(c) is a front view schematically showing the state after the liquid droplets are brought into contact and mixed with each other, and FIG. 3(d) is a plan view showing that state.

FIG. 4 is a sectional view schematically showing an embodiment of the liquid formation control actuator of the present invention, in which FIG. 4(a) shows the state before liquid droplets are aggregated, FIG. 4(b) shows the state that liquid droplets are aggregated in a region where liquid droplets are unnecessary, and FIG. 4(c) shows the state that liquid droplets are aggregated in a region where liquid droplets are intended to be collected.

FIG. 5 is a partial plan sectional view schematically showing an embodiment in which a liquid flow control actuator of the present invention is disposed in a cylindrical passage, in which FIG. 5(a) shows the state that the flow of a liquid is shut off, and FIG. 5(b) shows the state that the flow of a liquid is opened.

FIG. 6 is a partial plan sectional view schematically showing an embodiment in which a liquid flow control actuator of the present invention is disposed in a slit-like passage, in which FIG. 6(a) shows the state that the flow of a liquid is shut off, and FIG. 6(b) shows the state that the flow of a liquid is opened.

FIG. 7 schematically shows two states of wettability on the surface of a solid, in which FIG. 7(a) is a partial sectional view schematically showing the state (Cassie-state) that gas enters into clearances, and FIG. 7(b) is a partial sectional view schematically showing the state (Wenzel-state) that a liquid enters into clearances.

DESCRIPTION OF NUMERICAL SYMBOLS

11 Liquid (liquid droplet)
12 Water-repellent layer (porous layer)
14 Electrolyte layer (polymer pump layer)
15 Liquid-preservation layer (water-preservation layer)
13a Electrode part (on the water-repellent layer side)
13b Electrode part (on the liquid-preservation layer side)
16 Substrate
17 Terminal
18 Power source
111 Liquid (liquid droplet)
112 Water-repellent layer (porous layer)
114 Electrolyte layer (polymer pump layer)
113a Electrode part
113b Electrode part
116 Substrate
117 Terminal
118 Power source
21 Liquid droplet
22 Water-repellent layer
22a Convex part on the surface of the water-repellent layer (surface roughness)
22b Concave part on the surface of the water-repellent layer (surface roughness)
23 Electrolyte layer
24 Liquid molecule (water molecule)
25a Electrode part
25b Electrode part
A Direction of the flow of liquid (water) (direction of the water-repellent layer)
B Direction of the flow of liquid (water) (direction of the composite material)
26 Gas molecule (hydrogen molecule)
27 Gas molecule (oxygen molecule)
C, D Direction of volatilization of gas
30 Liquid droplet-mixing actuator
31a Liquid droplet
31b Liquid droplet
31c Liquid droplets brought into contact and mixed with each other
32, 33, 34 Wettability controlling face
35 Gas
40 Liquid formation control actuator
41 Substrate
42 Liquid actuator (position where the aggregation of liquid droplets is undesired)
43 Liquid actuator (position where the aggregation of liquid droplets is desired)
44 Liquid droplets aggregated in a region where no liquid droplet is required
46 Liquid droplets aggregated in a region where the collection of liquid droplets are desired
51 Dividing wall (diaphragm, cylindrical passage)
52 Liquid
53 Liquid flow control actuator (flow valve)
54a Foam (foam left on an element)
54b Foam (foam flowed away)
55 Direction of flow of a liquid
61 Substrate (wall part)
62 Liquid
63 Liquid flow control actuator (flow valve)
64a Foam (foam left on an element)
64b Foam (foam flowed away)
65 Direction of flow of a liquid
91 Liquid droplet
92 Solid surface
92a Convex part on the surface (surface roughness)
92b Concave part on the surface (surface roughness)

BEST MODE FOR CARRYING OUT THE INVENTION

The liquid actuator of the present invention comprises: an electrolyte layer, two or more electrically separated electrode parts provided on one or both sides of the electrolyte layer, and a water-repellent layer having a porous structure on an outside surface of at least one of the electrode parts; in which the electrolyte layer, the electrode parts, and the water-repellent layer form a structural body; wherein voltage is applied across plural electrode parts, and the applied voltage is adjusted to change the superficial wettability of the structural body. In a preferred embodiment of the liquid actuator, a liquid contained in the structural body is made to permeate through and exude to the surface of the water-repellent layer, or a liquid on the surface of the water-repellent layer is made to permeate into and be absorbed in the inside of the structural body (herein, the "permeating through and exuding to" means that a liquid inside of the structural body is exuded to the outer surface through permeation, and the "permeating and being absorbed" means that a liquid on the outside surface of the structural body is absorbed in the structural body through permeation), thereby controlling the hydrophilicity of the surface of the water-repellent layer; and also, a liquid in the vicinity of the electrode parts is electrolyzed to generate gas on the surface of the water-repellent layer, thereby allowing the surface of the water-repellent layer to be hydrophobic. Moreover, in a preferred embodiment of the liquid actuator, a liquid in the structural body is guided to the surface of the above water-repellent layer by controlling the voltage to be applied across the electrode parts, to thereby bring the thus-guided liquid into contact with a liquid on the surface of the water-repellent layer, thereby non-fluidizing the liquid; or generating gas in the vicinity of the surface of the above water-repellent layer to push up the liquid by the pressurized gas, thereby fluidizing the liquid. The present invention will be explained in detail.

There is no particular limitation to the electrolyte that can be used in the liquid actuator of the present invention, and the electrolyte may be a cationic electrolyte or anionic electrolyte. Also, the electrolyte may be any of an organic electrolyte, an inorganic electrolyte, or an electrolyte of combination thereof.

Examples of the organic electrolyte include organic electrolytes having a sulfonic acid group, a carboxyl group, a phosphoric acid group, a phosphonic acid group, a phosphinic acid group, a quaternary ammonium group, a tertiary amino group, a secondary amino group, or a primary amino group. Polymer (or high-molecular) electrolytes having one or two or more of these groups are preferable. Among these electrolytes, polymer electrolytes having a sulfonic group or a carboxyl group are preferable, and specific examples of the electrolyte include a perfluorosulfone membrane (for example, Nafion (trade name), manufactured by Du Pont.).

Examples of the inorganic electrolyte include electrolytes constituted of lithium, phosphorous or sulfur, electrolytes constituted of inorganic proton conductive oxide particles (for example, electrolytes consisted of hydrated antimony oxide ($Sb_2O_5 \cdot nH_2O$), or electrolytes consisted of the above inorganic proton conductive oxide particles and inorganic matrix components (for example, zirconium oxide ($ZrO_2$), silica ($SiO_2$), titania ($TiO_2$), and alumina ($Al_2O_3$)).

Also, examples of the mixture electrolytes of inorganic types and organic types include organic/inorganic mixture electrolytes, obtained by combining an organic electrolyte layer with an inorganic electrolyte layer, by using a binder constituted of an ion exchanged form; and electrolytes using a solid acid which is obtained by carbonizing a product after an aromatic hydrocarbon is treated with heated concentrated sulfuric acid, with an amorphous carbon material made of a polycyclic aromatic sulfonic acid.

Also, as the electrolyte, use may be made of those disclosed, for example, in JP-A-2004-335231, JP-A-2004-281147, JP-A-2004-247286, JP-A-2003-190962, JP-A-2003-151580, JP-A-2002-329524; Solid State Ionics 5 (1981) 663-666; Electrochemistry 65, No. 11 (1997) 914-919; JP-A-2001-250580; J. Am. Cream. Soc, 84 [2] 477-79 (2001); JP-B-5-48582 ('JP-B' means examined Japanese patent publication), JP-A-4-231346, The 26th Symposium on Solid State Ionics Lecture Prints (2000) 174-175, U.S. Pat. No. 6,025,094, U.S. Pat. No. 5,314,765, JP-A-2002-56857, JP-A-2001-357879, JP-A-2000-103899; Y. M. Li et al., Solid State Ionics, 134, pp. 271-278, 2000.

No particular limitation is imposed on the size and shape of the electrolyte. However, when the electrolyte has a tabular shape, it preferably has a size of about 100 mm in length and width, and a thickness of 200 μm or less. When a shape other than a tabular shape is adopted, for example, a cylinder form, or a form modeled on an intended form may be used.

Any electrode material may be used as the electrode material to be used in the liquid actuator of the present invention insofar as it has necessary conductivity, and gold, platinum, copper, any other metal, carbon, or the like may be used, and these materials may be used either singly or in combination of two or more thereof.

It is preferable that the electrode part be disposed on both sides or one side of the electrolyte layer and have a porous structure. To mention its form in detail, it is preferably, for example, a form which allows the passage of a liquid which participates in the 'penetrating through and exuding to' and 'permeating and being absorbed in' the water-repellent layer, or allows the passage of gas molecules generated there, and which can secure the conductivity required for the electrode. However, when water is supplied enough to the surface of the electrode, the electrode part is unnecessarily porous. For this, the state of the electrode may be specifically a form coated along the surface shape of the electrolyte membrane or a porous thin layer membrane form. Though any method may be used insofar as it is a formation method which can provide such a form, the electrode part may be formed using a method such as chemical plating, application of a metal thin film by using an adhesive or sputtering. Also, porous processing may be carried out either when the metal thin film is formed or after the metal thin film is formed. To mention in more detail, examples of the porous processing include nano-in-print processing and masking processing.

Though there is no particular limitation to the thickness of the electrode part, the thickness is preferably 10 μm or less.

In the liquid actuator of the present invention, a water-repellent layer is formed on at least one electrode part. The water-repellent layer may be formed by making, for example, a fluorine type, paraffinic type or a silicon type material into a particle form, which is dispersed in a solvent (for example, a liquid adhesive), applied, dried and solidified.

Examples of the water-repellent agent include those using a paraffin type water-repellent agent, a fluorine (resin) type water-repellent agent, a silicon (resin) type water-repellent agent, a vinyl polymer (resin) type water-repellent agent, a urethane (resin) type water-repellent agent, a polyethylene (resin) type water-repellent agent, an alkyl urea type water-repellent agent (including, for example, an alkyl ethylene urea type water-repellent agent), a fatty acid amide (resin) type water-repellent agent, an epoxy (resin) type water-repellent agent, a phenol (resin) type water-repellent agent, a butyral (resin) type water-repellent agent, an acryl (resin) type water-repellent agent, a metal complex salt type water-repellent agent, or a wax type water-repellent agent (including a wax emulsion type water-repellent agent, an acryl resin paraffin wax-combining type water-repellent agent, and a paraffin wax type emulsion type water-repellent agent). Among these water-repellent agents, a fluorine type water-repellent agent, a paraffin type water-repellent agent, or a silicon type water-repellent agent is preferable.

The thickness of the water-repellent layer is preferably several μm, though no particular limitation is imposed on it. The water-repellent layer preferably has a porous structure in the inside thereof, and has water permeability, and have many fine holes of, for example, 10 to 100 μm in diameter in which those holes are independent from each other.

The liquid actuator of the present invention may be provided with a liquid-preservation layer, according to the need. The liquid-preservation layer is preferably provided on the side opposite to the water-repellent layer on the electrolyte layer, and is more preferably disposed on the electrode part on the side opposite to the water-repellent layer. Though any material may be used for the liquid-preservation layer insofar as it can reserve the liquid and can supply the liquid to the electrolyte layer, examples of the material for the liquid-preservation layer include a gel, porous material, and non-woven fabric. When a tabular material such as a nonwoven fabric is used, it is made to have the same size as the electrolyte layer and the preferable range of the size is also the same.

Examples of the liquid retained in the liquid-preservation layer include, though not particularly limited to, aqueous media (for example, water, or water dissolving a metal ion or ammonium ion therein), an aqueous methanol solution, and an aqueous ethanol solution. Also, use may be made of a liquid, such as IMPC (ion polymer and metal composite) like an ionic liquid, which enables driving of an actuator. The liquid-preservation layer is preferably stuck or adhered to the electrode, and can be stuck and secured to the electrode by using, for example, an acryl type adhesive or epoxy type adhesive.

In the liquid actuator of the present invention, voltage is applied across at least two electrode parts. Though any method may be used to apply voltage, terminals (for example, copper, gold, or platinum) are formed on the electrode parts and both terminals may be connected to the positive and negative electrodes of a power source (for example, a transformable constant-voltage power source).

According to the liquid actuator of the present invention, the superficial wettability of a structural body can be controlled. This wettability will be explained hereinbelow.

Generally, the superficial wettability of a solid is classified, using the contact angle with water, into a hydrophilic class (contact angle: 0° or more and less than 90°), a water-repellent class (contact angle: 90° or more and less than 150°), and a super water-repellent class (contact angle: 150° or more). The super water-repellent class having a contact angle of 150° or more is achieved for the first time when imparting fractal-shaped roughness to the surface of a solid to improve water-repellency.

Figure 7:
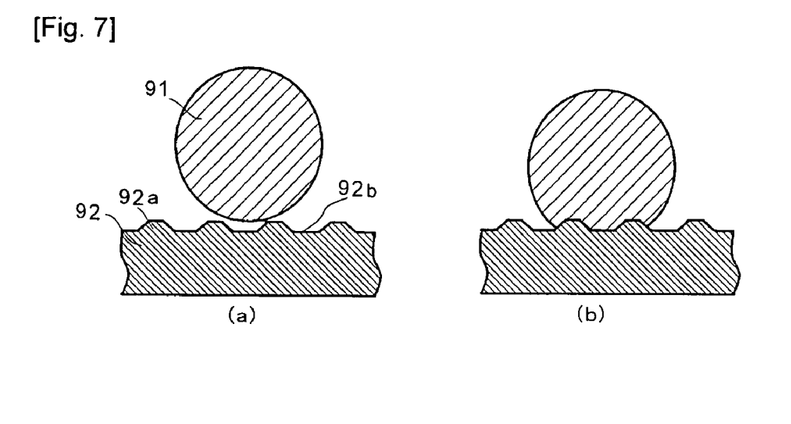

The wettability of the roughened surface of a solid takes two states. Specifically, there are such a state (Cassie-state) that gas enters into clearances formed by the roughness and such a state (Wenzel-state) that a liquid enters into clearances formed by the roughness. These two states are shown in FIG. 7. In FIG. 7, ($a$) and ($b$) are partial sectional views schematically showing the Cassie-state and Wenzel-state, respectively. The surface 92 of a solid is provided with a convex portion 92a and a concave portion 92b, showing the roughness of the surface of the solid, and it is therefore shown that the surface is provided with certain water repellency. In FIG. 7(a), gas enters into clearances formed between a liquid droplet 91 and the surface 92 of the solid, but in FIG. 7(b), the liquid droplet 91 is in contact with the surface of the solid 92 without any clearance between the both. There is the case where both the Cassie-state and the Wenzel-state are developed even on the same solid surface though depending on the state, and also, there is the case where a transition from the Cassie-state to the Wenzel-state is caused.

Further, in the Wenzel-state, liquid droplets are scarcely rolled and contact angle hysteresis is more increased than in the Cassie-state. This is assumed to be because the roughness of the solid surface is a hindrance to the movement of liquid droplets in the Wenzel-state and the gas in the clearances serves as a cushion in the Cassie-state. To mention these states in terms of contact angle hysteresis, the Wenzel-state corresponds to a state increased in contact angle hysteresis and the Cassie-state corresponds to a state reduced in contact angle hysteresis. For example, the contact angle hysteresis is 90° or more in the Wenzel-state, and less than 90° in the Cassie-state. The contact angle hysteresis is obtained by finding a difference between a forward contact angle and a backward contact angle when a sample to which a liquid droplet is fixed is tilted until the liquid droplet starts sliding.

In the meantime, there are many water-repellent surfaces obtained by subjecting hydrophilic base materials to water-repellent coating treatment among water-repellent surfaces obtained industrially. Such a water-repellent surface is basically different from the surfaces put in the above Wenzel-state or Cassie-state. In the present invention, regardless of the hydrophilicity/hydrophobicity of base material, the state in which gas enters into clearances between liquid droplets and the surface of the base material is called a Hovered-state (the range of the contact angle hysteresis is the same as in the case of the Cassie-state), and the state in which a liquid enters into clearances between liquid droplets and the surface of the base material is called a Pinned-state (the range of the contact angle hysteresis is the same as in the case of the Wenzel-state). The foregoing transition from the Cassie-state to the Wenzel-state suggests the possibility of a transition from the Hovered-state to the Pinned-state. In the liquid actuator of the present invention, gas is switched from a liquid and can be inserted into the clearances and vice versa, so that the reversible state transition from the Hovered-state to the Pinned-state can be controlled to accomplish switching from a hydrophilic state to a hydrophobic state and vice versa.

As the equation giving the wettability, the Young's equation, the Wenzel's equation, and the Cassie's equation are known.

First, the wettability of a smooth face free from any dirt is given by the Young's equation.

$$\cos\theta = (v_{sv} - v_{sl})/v_{lv} \quad \text{Formula (1)}$$

θ represents a contact angle; and $v_{sv}$, $v_{sl}$, and $v_{lv}$ represent free energies per unit area of gas-solid, solid-liquid, and liquid-gas, respectively. Also, the wettability of a roughened surface is given by the Wenzel's equation.

$$\cos\theta' = r(v_{sv} - v_{sl})/v_{lv} \quad \text{Formula (2)}$$

θ' and θ represent contact angles of a non-roughened surface and a roughened surface, respectively; and r represents an area ratio obtained when the surface area made larger by the surface roughness is divided by the apparent surface area.

Moreover, the wettability of a surface with clearances filled with the air is given by the Cassie's equation.

$$\cos\theta' = f_1\cos\theta_1 + (1-f_1)\cos\pi = f_1\cos\theta_1 + (1-f_1) \quad \text{Formula (3)}$$

$\theta_1$ represents a contact angle of a non-roughened surface, and $f_1$ represents the percentage of the area of the solid at the interface between the solid and the liquid.

Next, an equation that defines the wettability in each of the Hovered-state and the Pinned-state is derived in the same manner as above. Even if the base material is hydrophilic, the liquid is not brought into contact with the hydrophilic base material if a plenty of gas exists in the clearances. For this, the Cassie's equation is applied to the Hovered-state. An equation representing the Pinned-state is derived in consideration of the balance between energy components in the direction of the X axis, and is represented by a combination of the hydrophilic base material and the water-repellent coat (layer).

$$\cos\theta' = rr'(v'_{sv} - v'_{sl})v_{1v} + r(1-r')(v'_{sv} - v'_{sl})/v'_{1v} \quad \text{Formula (4)}$$

$v'_{sv}$, $v'_{sl}$, and $v'_{1v}$ represent free energies per unit area of gas-solid, solid-liquid, and liquid-gas, respectively, in the base material. r' represents the ratio of the surface area of the base material to the surface area of the hydrophilic coat (layer).

Three surface tensions of gas-solid, solid-liquid, and liquid-gas which are balanced act on a stationary liquid. In order to move liquid droplets, it is necessary to do work on the balanced surface tensions. This suggests that a work is necessary to accomplish the transition between the Hovered-state and the Pinned-state. Also, it is considered from the above equation that the workload is different depending on surface shape and raw material. The liquid actuator of the present invention functions as a polymer pump using an electrolyte to make it possible to insert either water or the air by switching action. This function ensures that reversible transition between the Hovered-state and the Pinned-state can be controlled.

Next, an embodiment of the liquid actuator of the present invention will be explained in more detail.

The liquid actuator of the present invention is provided with electrode parts disposed electrically apart from each other on both sides or one side of the electrolyte layer (herein, the "electrically apart" is defined, for example, by a resistance in a dry state. The resistance between electrode parts formed on a polymer electrolyte is generally several Ω to several tens of Ω per 1 cm width and 1 cm length in a dry state. Herein, the "electrically apart" means that the resistance is generally, for example, several kΩ or more, and preferably several MΩ or more in the above condition. When, for example, Nafion (trade name, manufactured by Du Pont.) is used as the polymer electrolyte and platinum particles are produced by reducing in Nafion by chemical treatment, many platinum particles are present at a depth of about several micrometers from the surface (usually, these particles are all included in a region to a depth of about 20 micrometers from the surface). Therefore, the electrically isolated state may be produced by forming a groove having a depth of tens of micrometers from the surface. This can be realized, for example, by burning off only the surface using a laser. At that time, it is only required that the resistance is increased up to the intended value, in which the width may be, for example, several micrometers.) When two or more electrode parts are formed, and voltage is applied to at least two among them, no particular limitation is imposed on the arrangement of each electrode part. Detailed explanations will be described as to two preferred embodiments differing in the arrangement of the electrode parts.

(A) First, an embodiment will be explained in which one or more electrode parts are disposed on each side of the electrolyte layer, and voltage is applied to the electrode parts on each side of the electrolyte layer.

Figure 11:
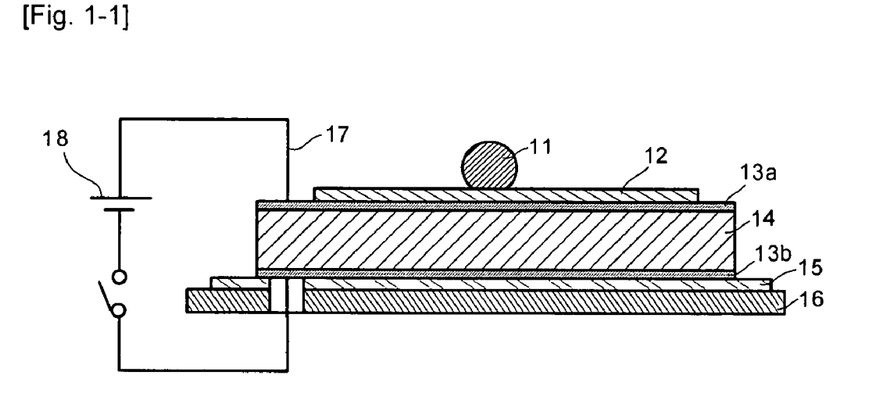

Examples of the liquid actuator in this embodiment include a liquid actuator shown in FIG. 1-1. In the embodiment of FIG. 1-1, electrode parts 13a and 13b are disposed on a respective side of an electrolyte layer 14. Then, a water-repellent layer 12 is disposed on the outside surface of the electrode part 13a, and the wettability and amount of a liquid droplet 11 on the surface of the water-repellent layer are controlled. A water-reservation layer 15 is disposed on the outside surface of the electrode part 13b and a substrate 16 is disposed on the outside of the water-reservation layer 15. The electrode parts 13a and 13b are connected to a DC power source 18 through a terminal 17. At that time, the electrode parts 13a and 13b may not be disposed on the entire surface of the electrolyte layer 14, but may be disposed on a part of each surface and the both electrodes may be positioned shifting from the position where the electrodes face each other. Like the embodiment of the liquid actuator shown in FIG. 1-1, two electrodes (13a, 13b) are disposed on each side of the electrolyte layer 14, whereby it is possible to increase the sectional area of a transfer passage for ions and a solvent in the electrolyte layer 14. Moreover, the distance of travel can be made shorter corresponding to the thickness of the electrolyte layer 14. This enables raw material having a low ion conductivity to be utilized as the electrolyte layer 14, which can widen the range of selection of materials for the electrolyte layer 14.

(B) Next, another embodiment will be explained in which at least two or more electrode parts which are electrically apart from each other are disposed on one side of the electrolyte layer, and voltage is applied across electrode parts apart from each other on one side of the electrolyte layer.

Figure 12:
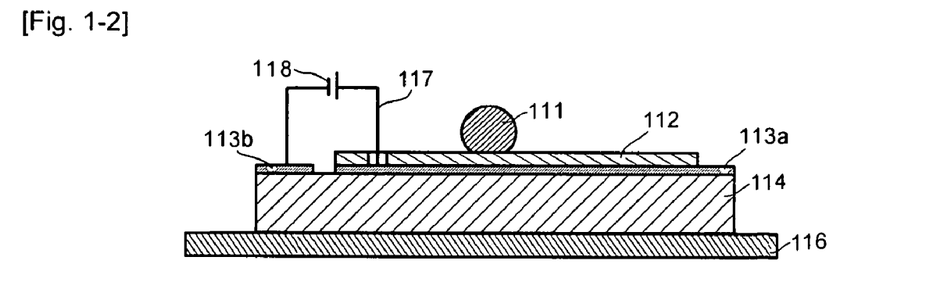

Examples of the liquid actuator in this embodiment include a liquid actuator shown in FIG. 1-2. In the embodiment of FIG. 1-2, electrode parts 113a and 113b are disposed on only one surface of the electrolyte layer 114, and these electrode parts are divided into plural portions (two in the illustrated liquid actuator), and these divided portions are electrically apart from each other. Then, a water-repellent layer 112 is disposed on the outside surface of the electrode part 113a, and the wettability and amount of a liquid droplet 111 on the surface of the water-repellent layer are controlled. A substrate 116 is disposed on the side opposite to the electrode part side of the electrolyte layer 114 (at that time, another electrode layer (or electrode part), a water-reservation layer, and the like may be further disposed between the electrolyte layer 114 and the substrate 116). The electrode parts 113a and 113b are connected to a DC power source 118 through a terminal 117. In this manner, two electrode parts (113a, 113b) may be formed on the same face of the electrolyte layer 114, in which one of these electrodes is made to be an anode and the other is made to be a cathode.

Two electrode parts may be formed either separately or by dividing one electrode layer after that electrode layer is formed. As a specific dividing method, there is a method in which an electrode layer is disposed on one side of the electrolyte layer, and then abraded together with the surface of the electrolyte layer by using a glass knife or the like. Alternatively, a laser processing method or a photomask method may be used to divide one electrode layer into two or more electrode parts having desired shapes. There is no particular limitation to the number of electrodes, and a large number of electrode parts are preferably structured according to use (this is the same to the liquid actuator of the embodiment (A)). In this case, the electrode and wiring are preferably integrated.

In this embodiment (B), ions and solvents are limited in movement in a vertical direction (direction of the thickness) in the polymer electrolyte. Specifically, these ions and solvents mainly move to the plane direction (the longitudinal direction of the electrolyte layer 114 in FIG. 1-2) of the electrolyte layer. Generally, ununiform distribution of a solvent in the direction of the thickness of an electrolyte layer is a cause of the strain or warpage of the electrolytic film. According to this embodiment (B), the movements of ions and solvents in the direction of the thickness are decreased, so that internal strain caused in the direction of the thickness in the electrolytic film is decreased, whereby stress in the direction of the thickness which is caused in a device can be decreased.

Moreover, even in the case of applying voltage to the same electrode, in the case of the embodiment (B), the movements of ions and solvents are concentrated on one face (the face on the electrode 113a side of the electrolyte layer 114 in the liquid actuator of FIG. 1-2) of the electrolyte layer, and the movement of these components on the other face (the face on the substrate 116 side of the electrolyte layer 114 in the liquid actuator of FIG. 1-2) are reduced. This shows that in the case of, for example, the liquid actuator of FIG. 1-2, the generation of strain in the underside of the electrolyte layer 114 (the face brought into contact with the substrate 116) is suppressed. Moreover, if the electrolyte layer is made thick, only the upper face of the electrolyte layer 114 is deformed, to allow the vicinity of the underside of the electrolyte layer 114 to have a stain-buffering function. Specifically, the liquid actuator of this embodiment can reduce the cause of the peeling of the interface between the electrolyte layer 114 and the device base material 116 (for example, the electrode layer or water-reservation layer according to the need). This widens the choice of the electrolyte and also can improve the reliability of a device when the operation of the device is repeated plurally.

In the liquid actuator of the present invention, water or gas can be supplied to clearances in the water-repellent layer by using the electrolyte layer (polymer pump) disposed on the under part of the water-repellent layer surface. The supply of water to these clearances ensures that the surface state of the water-repellent layer can be transited to the Pinned-state from the Hovered-state. Also, the supply of gas to these clearances ensures that the surface state of the water-repellent layer can be transited to the Hovered-state from the Pinned state. The supply of water using the polymer pump can be efficiently accomplished by pumping water from the water-reservation layer to the water-repellent layer, and the supply of gas can be accomplished by electrodialysis of water at the interface between the water-repellent layer and the polymer pump layer.

With regard to the principle of the polymer pump, a sulfonic acid ($-SO_3H$) type strong acidic cation exchange resin is given as an example to explain (though the present invention is not limited to this). In the inside of this electrolyte, a polymer side chain bears a negative charge and is bound by the principal chain. For this, even if an electric field is applied, the negative charge does not move. On the other hand, positively charged ions unbound by the principal chain move corresponding to the electric field, and therefore, water affined to the positively charged ions move along with the movement of the positively charged ions.

Figure 2:
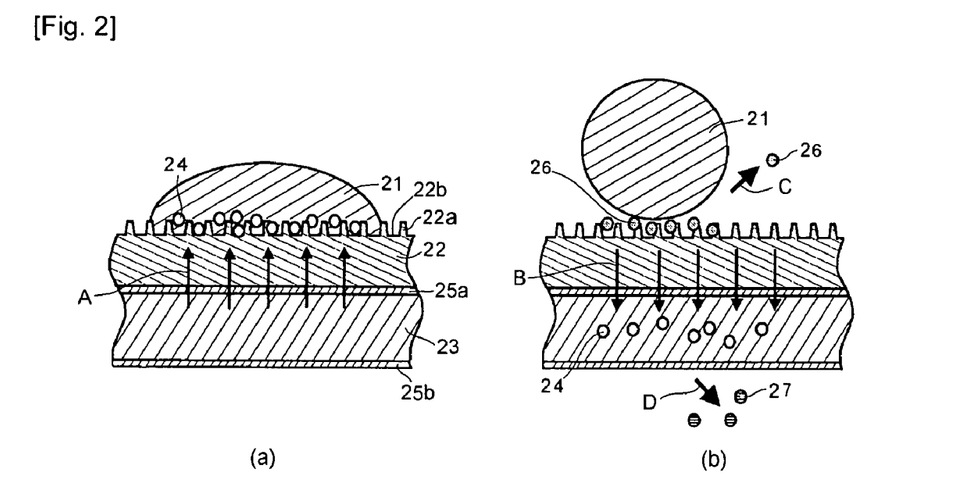

Here, the mechanism of this reversible transition will be explained with reference to FIG. 2. FIG. 2 is an enlarged partial sectional view schematically showing an embodiment of the liquid actuator of the present invention (here, an example using a cation exchange resin will be explained, but the present invention is not limited to this. Also, the size of each structural member of the device is not limited to that shown in the figures). FIG. 2(a) shows the state in which the electrode potential of the water-repellent layer side is lower than that of the counter electrode (hereinafter, this state is called negative voltage, unless otherwise specified), to improve the wettability of this surface (herein, the "(to) improve the wettability" means that the state of the surface is changed in a such direction as to increase the contact angle hysteresis. The contact angle is preferably changed to 90° or more. This is also called surface hydrophilic treatment or liquid non-fluidization). FIG. 2(a) shows the state when negative voltage is applied to the electrode part 25a of the water-repellent layer 22 side, and FIG. 2(b) shows the state when positive voltage is applied to the electrode part 25a. The surface of the water-repellent layer is provided with roughness, and is preferably provided with irregularities formed to the extent that it exhibits water-repellency (preferably, the Cassie-state or Hovered-state) in the state that no liquid is present in the clearances formed by these irregularities. A convex portion 22a and a concave portion 22b in the figures shows the surface roughness schematically. Here, the electrode part 25a or 25b is disposed on the surface of the respective side of the electrolyte layer 23 (in this case, a water-reservation layer, a substrate and the like may be further formed, though not illustrated in FIG. 2). As shown in FIG. 2(a), when a relatively low negative voltage is applied to the electrode part 25a of the water-repellent layer 22 side of the electrolyte layer 23 (the case of applying a relatively high voltage will be described later), the internal water 24 moves in the direction A of the water-repellent layer corresponding to voltage. The water 24 permeates through the water-repellent layer 22 to exude to the surface thereof, to thereby attract a liquid droplet 21 formed on the surface. The superficial wettability of the water-repellent layer can be improved in this manner.

On the other hand, as shown in FIG. 2(b), when positive voltage is applied to the water-repellent layer side, the water 24 permeates through and is absorbed in the electrolyte layer 23 in a direction B towards the layer 23. For this, the surface of the water-repellent layer is deprived of water and resultantly put into the Hovered-state, and therefore, the liquid droplet 21 can be fluidized. If the voltage is more increased, here, not only the polymer pump can run pumping but also water in the vicinity of the electrode part can be electrolyzed. Because the standard electrode potential of water is 1.229 V, water is electrolyzed at the interface between the polymer pump and the water-repellent layer by applying a voltage higher than the standard electrode potential irrespective of its polarity. This results in the generation of hydrogen from the water-repellent layer 22 side to which positive voltage is applied, and in the generation of a gas 27 (oxygen) from the other electrode part 25b to which negative voltage is applied. A gas 26 (hydrogen) generated below the liquid droplet 21 exhibits the effect of pushing up the liquid droplet 21, making it possible to lower the superficial wettability of the water-repellent layer (the "(to) lower the wettability" herein means that the surface state is changed in such a direction as to reduce the contact angle hysteresis, and the contact angle is preferably changed to less than 90°. This is also called surface hydrophobicity or liquid fluidization). Also, a part of the gas 26 is volatized in an outside direction C, and the gas 27 generated at the other electrode is volatized in an outside direction D (in the figure, the gas volatized to the outside is represented schematically by a symbol for the sake of explanation).

As mentioned above, the movement of a liquid (for example, liquid droplets and liquid fluid) which is in contact with the surface of the water-repellent layer can be controlled by changing the superficial wettability of the water-repellent layer. If external force is used, the movement of a liquid can also be drive-controlled.

Here, explanations will be described as to the state of FIG. 2(a), that is, the state when negative voltage is applied to the electrode part 25a of the water-repellent layer 22 side to raise the voltage. At that time, the wettability is determined by a balance between the effect (surface hydrophilicity) obtained by permeation and exuding to of water or moisture and the effect (surface hydrophobicity) accelerated by the generated gas, and therefore differs depending on the material and liquid to be used. In many cases, the effect obtained by gas generation is large, and it is therefore preferable that the surface is put into the Hovered-state in this condition.

The voltage to be applied is preferably in a range from −1.229 V to 1.229 V in terms of voltage across electrodes if there is no electric loss and the amount of water is preferably changed by the permeation-and-exuding- to or permeation-and-absorption-in the surface of the water-repellent layer at a voltage falling in the above range (the surface of a structural body is preferably made to be hydrophilic by this treatment). Also, the voltage is preferably made to be less than −1.229 V or a voltage exceeding 1.299 V to generate gas, thereby making the surface hydrophobic.

In the case of taking electric resistance loss in a device into account, the amount of water is changed at a power source voltage ranging from −4.5 V to 4.5 V (preferably making the surface hydrophilic), or alternatively the surface is preferably made to be hydrophobic at a voltage less than −4.5 V or exceeding 4.5 V, though depending on the circuit to be adopted. It is more preferable that the amount of water be changed at a voltage ranging from −2 V to 2 V (preferably making the surface hydrophilic), or alternatively the surface be made to be hydrophobic at a voltage less than −2 V or exceeding 2 V.

The movement of water when voltage is applied to the electrode can be confirmed even with the naked eye, because, for example, the color of the surface of a composite material (IPMC) obtained by arranging a metal electrode on both sides of a polymer electrolyte is changed. Also, as mentioned above, there is the case where IPMC changes its own shape by pumping and when it is utilized, for example, as an actuator, it may be, for example, applied to a glass plate to prevent a change in shape.

In the foregoing examples, the explanations are offered using water as an example of the electrolytic solution. However, the present invention is not limited to this. The liquid which may be used is the same as that retained in the liquid-preservation layer, and the preferable range is also the same.

The liquid controlled on the surface of the water-repellent layer is not limited to water, and any liquid may be used insofar as it has the ability to give a change in wettability. Examples of the liquid include aqueous media (for example, water, and water dissolving a metal ion or ammonium ion therein), an aqueous methanol solution, an aqueous ethanol solution, a cell culture solution, and a dispersion liquid. Also, there is no limitation to the state of the liquid to be controlled on the surface of the water-repellent layer, and a stationary liquid, a liquid fluid, or a liquid droplet may be controlled. When liquid droplets are formed and controlled, the amount of the liquid droplets may be determined appropriately corresponding to its object. A micro-amount is preferable since the ratio of the surface to the volume is large. For example, the amount of the droplets is preferably 1 μl or less, and more preferably 1 nl or less.

The liquid actuator of the present invention may be increased or decreased in size according to the need, and may have, for example, a glass substrate size (50 mm×20 mm) or the size (about 5 mm square) much utilized in a micro-chemical field.

Further, another preferred embodiment of the present invention will be explained. The liquid actuator of the present invention is used either singly or by combining to make a liquid droplet mixing actuator. An example of this preferred embodiment is shown in FIG. 3.

Figure 3:
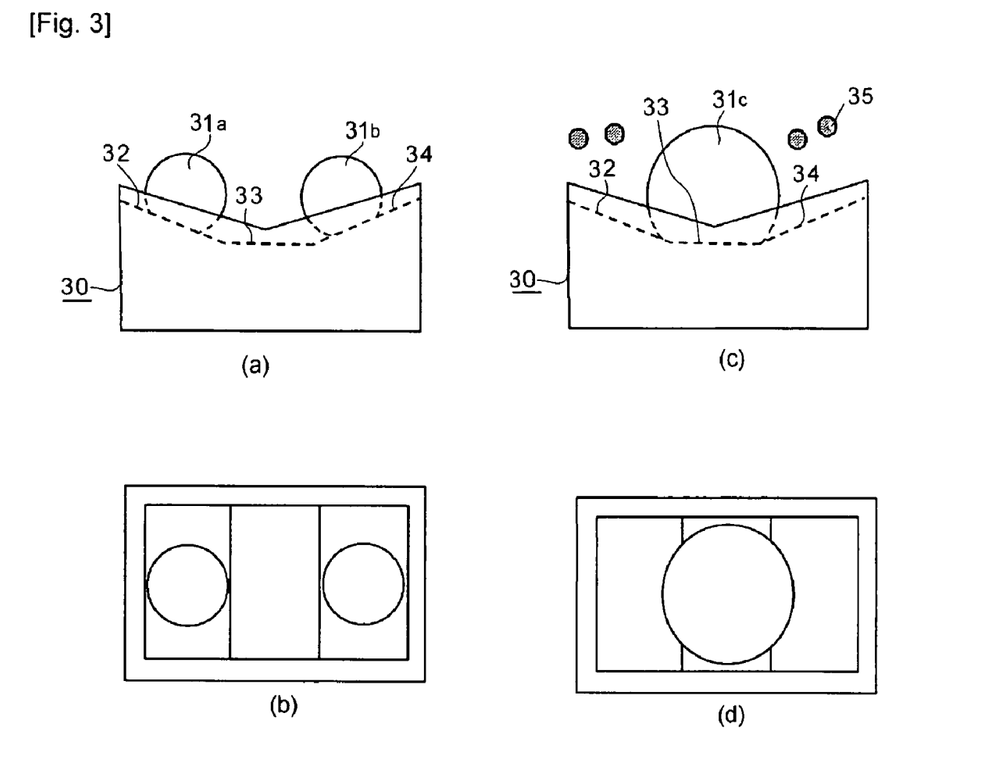

FIG. 3($a$) is a front view schematically showing the state where two liquid droplets are formed and fixed, FIG. 3($b$) is its plan view, FIG. 3($c$) is a front view schematically showing the state where liquid droplets are brought into contact and mixed, and FIG. 3($d$) is its plan view. In FIG. 3($a$), the liquid droplet control region is divided into three regions represented by a region 32, a region 33, and a region 34, in which the regions 32 and 34 on each end are tilted at an angle of, for example, 5 to 10°. Here, the center region 33 is disposed horizontally (at that time, the superficial wettability of each of the regions 32 to 34 can be controlled by the liquid actuator of the present invention, and the surface of the controlled region is also called "wettability control surface" as the case may be).

FIG. 3($a$) or 3($b$) show an initial state in which the wettability control surfaces 32 and 34 are put into the Pinned-state and a liquid droplet 31$a$ (liquid droplet using, for example, a solution A as a component) and a liquid droplet 31$b$ (liquid droplet using, for example, a solution B as a component) are respectively formed and fixed. The wettability control surface 33 is put into the Hovered-state. The wettability is changed to an inverse state from this state: Specifically, the voltage is adjusted to put each wettability control surface into a reverse state, thereby making possible to carry out bringing into contact and mixing.

When the bringing into contact and mixing is carried out, as shown in, for example, FIG. 3($c$) and FIG. 3($d$), the wettability control surfaces 33 and 34 disposed on each side are put into the Hovered-state and the center face 33 is put into the Pinned-state, to push up and fluidize the liquid droplets 31$a$ and 31$b$ by the gas 35 generated on the regions 32 and 34, thereby attracting the two liquid droplets to the center to bring these liquid droplets into contact with each other and mix these liquid droplets, thereby forming a liquid droplet 31$c$ (for example, liquid droplet using a mixture solution of A and B as its components) (in FIG. 3($c$), gas volatized to the outside is represented schematically by a symbol for the sake of explanation).

Next, when a further preferred embodiment is given, for example, a liquid droplet using a solution A as a component is used as the liquid droplet 31$a$, and a water droplet is used as the liquid droplet 31$b$. These liquid droplets are brought into contact with each other and mixed in the same manner as above, to make a liquid droplet 31$c$ comprising the solution A diluted with water.

According to the liquid droplet mixing actuator of the present invention and the method for the same as mentioned in the above, liquid droplets can be mixed at arbitrary timing and in a non-contact condition. For example, a chemical agent may be added at arbitrary timing in a medium. Also, even when the liquid droplet has a micro-size, mixing can be carried out with high accuracy.

Though three faces are respectively arranged at a different angle in this embodiment, two or more liquids may be mixed, using one controlled surface or plural controlled surfaces. Also, though the tilting is to accelerate the movement of liquid droplets, the driving force may be obtained by other means (for example, changing of the wettability of the bottom part, pressure, or wind force).

In the liquid droplet-mixing actuator 30 of the present invention, plural surfaces (regions) are respectively put into a state differing in wettability (or liquid droplet fluidity), enabling the mixing of liquid droplets. For this, each surface region may be constituted by combining different composite material devices. Alternatively, an electrode in one composite material device may be divided and the state of a charge may be made to be different in each region.

Figure 4:
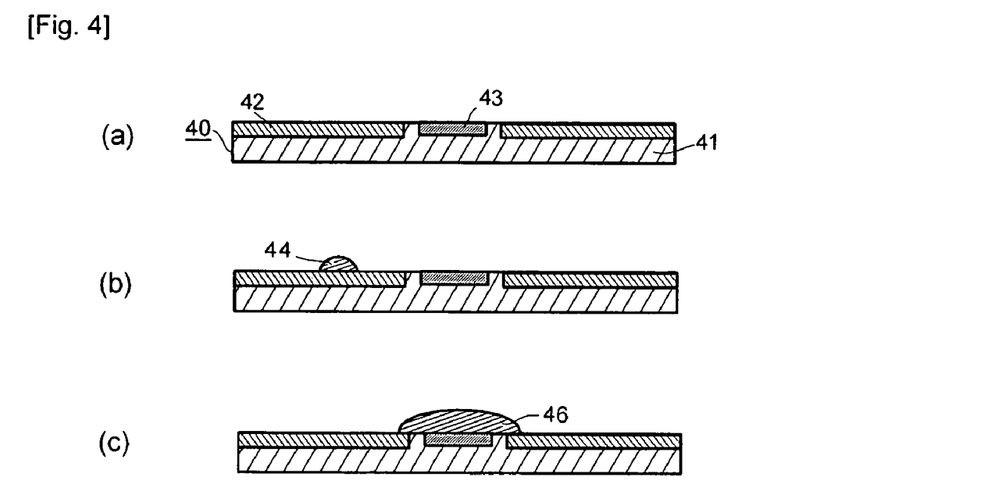

Next, still another embodiment of the present invention will be explained in detail. As shown in FIG. 4, an actuator in this embodiment controls the formation of a liquid or liquid droplets, by controlling each part of the wettability control surface independently. To explain in more detail, the wettability in each region is independently controlled. For example, a substrate 41 may be disposed according to the need to improve fixing ability and stability, a liquid actuator 42 may be disposed on a part of the substrate 41 and a liquid actuator 43 may be disposed on the other part. In addition, for example, the surface of one liquid actuator is processed to form a groove by a LD processing method (YAG laser processing method) or the like, thereby insulating each electrode part by cutting, making it possible to control each region independently.

The liquid formation control actuator 40 produced in the above manner is disposed under a circumstance where liquid droplets can be coagulated, whereby the intended amount of liquid droplets can be obtained at the intended position. Specifically, for example, the actuator 40 is preferably disposed under a high humidity (preferably, super-saturated condition). FIG. 4($a$) is a sectional view schematically showing the state of a liquid before the liquid is coagulated just after the actuator is installed. The region 42 where no liquid droplet is required is put into the Hovered-state, and the region 43 where the retention of liquid droplets is desired is put into the Pinned-state, whereby liquid droplets can be selectively coagulated and formed on the surface of the region 43. At that time, as shown in FIG. 4($b$), even in the case where liquid droplets 44 start coagulating in the region 42 where no liquid droplet 44 is required, these droplets can be extinguished by electrodialysis. When, on the other hand, liquid droplets 46 are coagulated on the wettability control surface 43, as shown in FIG. 4($c$), the amount and distribution of liquid droplets can be controlled appropriately by electrodialysis, using a video or the like to monitor the surface. Also, the amount of liquid droplets to be formed is preferably very small since the ratio of the surface to the volume is large. For example, the amount of the droplets is preferably 1 μl or less, and more preferably 1 nl or less.

According to the liquid formation control actuator of the present invention, the intended amount of liquid droplets can be selectively formed at the intended position. The liquid to be used is the same as that explained to control the surface of the water-repellent layer, and the preferable range is also the same.

Liquid droplets are formed under control in a non-contact state in this manner. Therefore, when, for example, plural liquid droplets are discharged, they can be independently controlled and therefore, they are free from mutual contamination. Also, because a pipette or the like is not used, the problem such as contamination caused by the intervention of the pipette can be solved. Even a liquid droplet so micro-sized that cannot be formed using a conventional method can be formed with high accuracy according to the liquid droplet formation actuator of the present invention, with the result that the accuracy of the control can be improved.

Next, further another embodiment of the present invention will be explained.

Figure 5:
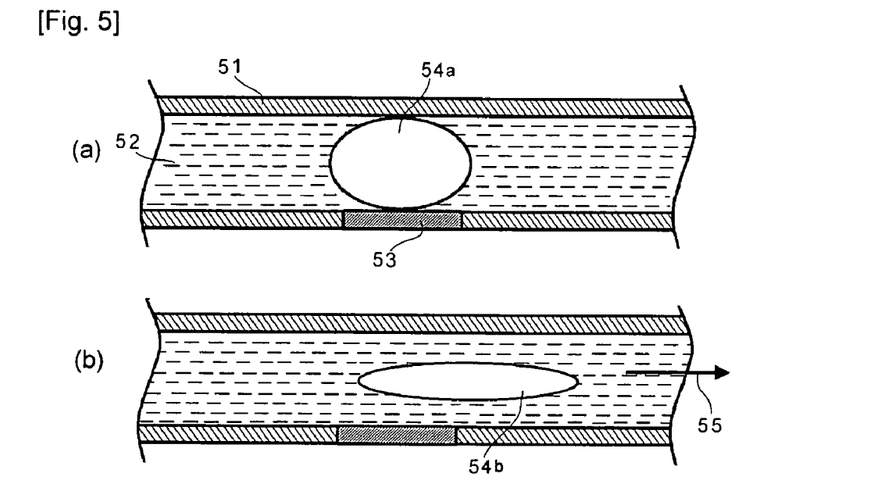

The liquid actuator of the present invention may be applied to a liquid flow control actuator as shown, for example, in FIG. 5. In FIG. 5, a liquid flow actuator 53 constituted of a liquid actuator is disposed in a cylindrical passage as a flow valve. FIG. 5(a) is a partial plan sectional view schematically showing the state where a foam 54a is made to generate in a passage constituted in the form of a cylinder and a valve is closed. In that state, the wettability control surface of the actuator 53 is put into the Hovered-state, and a liquid in front of and behind the wettability control surface is removed, making it possible to shut the flow of the liquid off. FIG. 5(b) is a sectional view schematically showing the state in which the wettability control surface of the actuator 53 is changed into the Pinned-state. Here, a liquid is pulled into the aforementioned surface, where the linkage between the foam and the pipe is weakened so that the foam 54b is flowed out in a flow direction 55. The valve is opened by this action. The shape of the pipe may be a shape with one opened surface, for example, a groove shape, besides a cylindrical form or a rectangular parallelepiped form.

Any material may be used to form a dividing wall 51, and examples of the material include glass, resins, and metals. The dividing wall 51 may be formed so as not to have a wall form but may be one obtained by forming a groove on the material. Also, no particular limitation is imposed on the place where the liquid flow control actuator 53 is to be installed, and the place can be appropriately selected from the bottom part, the wall surface part, the ceiling part, or the like according to the shape of the passage.

A liquid 52 is the same as that explained as the liquid that can be controlled on the surface of the water-repellent layer, and the preferable range is also the same. Though no particular limitation is imposed on the size of the passage, the passage may be increased or decreased in size. For example, the passage may be designed to have a size diameter of 10 mm or less which makes it easy to form the passage on a glass substrate, or a size diameter of 1 mm or less which is used in many cases in micro-chemical field. A valve can be constituted using a small number of parts, by using the above-described actuator and method.

A conventional flow valve is one which mechanically shuts off a flow of liquid, and it has a complicated structure and is expensive, so it is also unsuitable to make the valve size fine (micronization). Particularly, when the size of the conventional flow valve is made into fine, not only there arises the problem concerning opening and closing of the passage but also there may be caused the case where the flow control is hindered by the surface tension between the liquid and the passage wall. The liquid flow control actuator of the present invention solves these problems, and may be used as an excellent flow valve.

Figure 6:
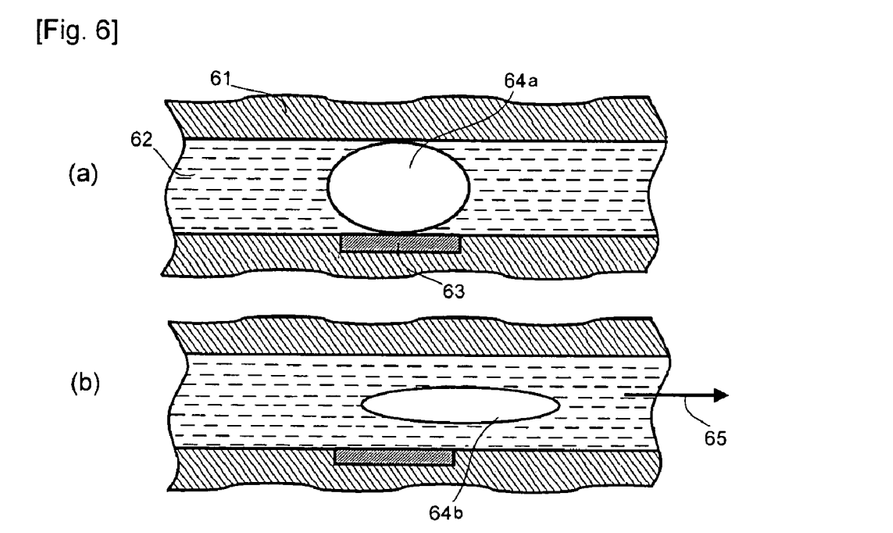

As another example of the liquid flow control actuator, one provided with a slit passage is shown in FIG. 6. FIG. 6(a) is a partial plan sectional view schematically showing the state where a foam 64a is made to be generated in the passage and the valve is closed. In that state, the wettability control surface of the actuator 63 is put into the Hovered-state, whereby the flow of the liquid can be shut off. FIG. 6(b) is a plan sectional view schematically showing the state where the wettability control surface of the actuator 63 is changed into the Pinned-state. Here, the liquid 62 is flowed out together with the foam 64b in the flow direction 65. In this device example, a wall part 61 is a base material such as a substrate on which a groove-like passage is formed. The ceiling part of the passage (a direction of the upper side perpendicular to the figure paper) may be opened or closed.

The present invention is not limited to the above-mentioned liquid actuator, liquid movement control actuator, liquid flow control actuator, liquid droplet mixing control actuator, liquid formation control actuator, and the like. Another examples of a preferred form of the present invention include a liquid distribution control actuator that controls the distribution of liquid and gas on the upper part of the water-repellent layer, a liquid distribution variable actuator, and a liquid actuator that controls the amount of a liquid in the liquid distribution variable actuator (herein, the "actuator" means a device that serves to perform the action and control of a substance, and the liquid actuators mentioned here are also called "liquid control devices" as the case may be). To explain the control of a liquid distribution in detail, for example, this is to arrange plural liquid droplets in the intended distribution on one substrate, and it is preferable to control the center coordinate and amount of each liquid droplet independently. This is attained by properly arranging the shape of the electrode of a liquid actuator by using laser processing or printing techniques. Further, according to the liquid actuator of the present invention, a feedback system may be provided in which information as to, for example, the amount of a liquid, distribution of a liquid, surface wettability, fluidity of a liquid, formation process of a liquid droplet and its state, flow condition of a liquid, and mixed state of liquid droplets is always observed and confirmed, to adjust voltage based on the information, thereby optimizing the conditions of operations.

According to the liquid actuator of the present invention, energy is not provided directly to a liquid itself but a bistable function (i.e. a function that no energy is required during the course of maintaining two states each having different wettability) is utilized, and various liquids may be used. Also, the liquid actuator of the present invention is free from the contamination of drain interference (a phenomenon that when a liquid is discharged, drainages from different paths are mixed to cause mutual contamination among liquids from different paths), and can be favorably used in appliances that need accuracy. Moreover, the liquid actuator of the present invention has a reversible function (function or ability to enable reversible transition between two states differing in wettability), it is free from the necessity of, for example, exchange of parts and alteration in processing condition in the operation of the device, and it enables works such as efficient analysis.

According to the liquid actuator of the present invention, various devices using this actuator can be small-sized. At this time, it is more difficult to control a liquid as the liquid is made into more fine size. However, the liquid actuator of the present invention solves even that problem, and enables fluidization or non-fluidization of fine liquid droplets, ensuring an excellent actuator (for example, a polymer actuator). For this, the liquid actuator of the present invention may be widely used in microchemical fields, and may be favorably utilized as control devices, for example, for micro TASs, microreactors, supply of fuel to fuel cells, Lab-on-a-chips, bio chips, health-care chips, PDMS chips, bio-sensors, and Bio-MEMSs (see, for example, U.S. Patent Application Publication No. 2004/0134854, WO02/066992, U.S. Patent Application Publication No. 2005/0064423, WO03/057875; by R. Jeffrey et al., Nature Materials, Vol. 4, (January, 2005), pp. 98-102; by M. G. Pollak et al., Applied Physics Letters, Vol. 77, No. 11, (September, 2000), pp. 1725-1726; and by T. B. Jones et al., Journal of Applied Physics, Vol. 89, No. 2, (January, 2001), pp. 1441-1445).

EXAMPLES

The present invention will be described in more detail based on examples given below, but the invention is not meant to be limited by these.

Example 1

According to the structure as shown in FIG. 1-1, platinum was provided to each surface of 40-mm-long, 15-mm-wide and 178-μm-thick Nafion 117 (trade name, fluorine-containing ion exchange membrane, manufactured by Du Pont.) in a thickness of about 3 μm by chemical plating. The resultant composite material was impregnated with a water-repellent agent (FS-1010, manufactured by Fluoro Technology) for 16 hours, and then drying and application of the water-repellent agent were repeated five times, to form a porous water-repellent layer.

As a water-reservation layer, a 40-mm-long, 15-mm-wide and 100-μm-thick acryl nonwoven fabric was utilized, and fixed to the surface of an electrode part on one side by using a duplicated film (NW-R15S, Nichiban Co., Ltd.). Further, a water-reservation layer was stuck and fixed to a 50-mm-long, 20-mm-wide and 2-mm-thick glass plate by using a SU adhesive (manufactured by Konishi). A hole (2-mm diameter) was formed through the electrode part exposed on the water-repellent layer side, the glass plate, and the water-reservation layer, and terminals were connected to the exposed electrode surfaces and also to the positive electrode and negative electrode of a power source (PA 10-3A, manufactured by Kenwood Corporation) respectively, to make a liquid actuator (test form 1) of the present invention.

In a test form 1 in the state where no liquid droplet was present, voltage was applied for 30 seconds such that the voltage of the electrode on the water-repellent layer side would be −2 V. After that, a liquid droplet of pure water was formed on the surface of the water-repellent layer by using a syringe (the size of the liquid droplet was about 2 mm in diameter). The plane carrying this liquid droplet was tilted, to measure a forward contact angle and a backward contact angle just before the liquid droplet fell. The measurement was made by taking a picture using a video. The contact angle hysteresis of this liquid droplet was measured. As a result, the contact angle hysteresis of the liquid droplet was 90° or more.

In the test form 1 in the state where no liquid droplet was present, voltage was applied for 3 minutes such that the voltage of the electrode on the water-repellent layer side would be −4.5 V. After that, a liquid droplet was formed with a syringe on the surface of the water-repellent layer by using the same solution as in Test Example 1. The size of the liquid droplet was about 2 mm in diameter. The contact angle hysteresis of this liquid droplet was 10° or less.

In the test form 1 in the state where no liquid droplet was present, voltage was applied for 30 seconds such that the voltage of the electrode on the water-repellent layer side would be −2 V. After that, a liquid droplet (about 2-mm diameter) was formed on the surface of the water-repellent layer by using a syringe and the same solution as in Test Example 1. The contact angle hysteresis of this liquid droplet was 90° or more. After that, the applied voltage was changed such that the voltage on the water-repellent layer side would be 4.5 V. Just then, it was confirmed that gas was generated from the interface between the liquid droplet and the water-repellent layer, and the contact angle hysteresis of the liquid droplet after a plenty of period of time passed (one minute) became 10° or less.

When the surface of the water-repellent layer was tilted at an angle of about 15° in that state, the liquid droplet fell. It is found from the change in contact angle hysteresis and the falling phenomenon that a transition from the Pinned-state to the Hovered-state was caused as a result of the change in voltage.

In the test form 1 in the state where no liquid droplet was present, voltage was applied for 3 minutes such that the voltage of the electrode on the water-repellent layer side would be 4.5 V. After that, a liquid droplet (about 2-mm diameter) was formed on the surface of the water-repellent layer by using a syringe and the same solution as in Test Example 1. The contact angle hysteresis of this liquid droplet was 10° or less. After that, the applied voltage was changed such that the voltage on the water-repellent layer side would be −2 V. The contact angle hysteresis of the liquid droplet after a plenty of time period passed (one minute) became 90° or more.

It is found from the change in contact angle hysteresis that a transition from the Hovered-state to the Pinned-state was as a result of the change in voltage.

Example 2

Three of the test forms 1 produced in Example 1 were combined, and according to the structure of FIG. 3, the surface of the water-repellent layer of the center test form was disposed horizontally, and the surface of the water-repellent layer of each of the test forms disposed on each end was tilted at an angle of 20°, to produce a liquid droplet mixing actuator (test form 2) of the present invention. Voltage was applied to the electrode on each surface side of two water-repellent layers disposed on each end for 2 minutes such that the voltage would be 2 V, and voltage was applied to the electrode of the both sides of the center water-repellent layer for 2 minutes such that the voltage would be 4.5 V. Then, a liquid droplet (2-mm diameter) of an aqueous 3% methanol solution was formed on one of the surfaces of the tilted water-repellent layers by using a syringe. Further, a liquid droplet (2-mm diameter) of pure water was formed on the surface of the other tilted water-repellent layer by using a syringe.

Then, the applied voltage was changed such that the voltage of the electrode on the surface of each of the tilted water-repellent layer on each end would be 4.5 V, and the voltage applied to the center test form was changed such that the voltage of the electrodes on both surfaces of the center test form would be 2 V. Just then, the liquid droplet fell on the center test form after 3 minutes, and two liquid droplets were brought into contact and mixed with each other. The thus-obtained methanol mixed solution was a uniform mixture solution.

Example 3

A 50-mm-long, 20-mm-wide and 2-mm-thick glass plate was disposed on and stuck to a 100-mm-long, 100-mm-wide and 2-mm-thick glass plate. A hole 10 mm in diameter was opened in the central part of the upper glass plate. The test form 1 was set to the hole part so as to have the same height of the glass plate, to produce a liquid formation control actuator (test form 3) of the present invention.

The thus-obtained test form 3 was placed in a test chamber kept at temperature 25° C. and adjusted to a super saturated state, and voltage was applied for 10 minutes such that the voltage of the electrode on the surface of the water-repellent layer would be 2 V. Just then, plural liquid droplets 1 μl or less in size were dispersed and grown on the surface of the water-repellent layer.

After that, the voltage was changed such that the voltage of the both surfaces of the water-repellent layer would be 4.5 V, and the voltage was applied for 2 minutes. Just then, the liquid droplets on the surface of the water-repellent layer disappeared.

Example 4

A liquid flow control actuator (test form 4) of the present invention was produced in the following manner. Platinum was provided to each surface of 40-mm-long, 115-mm-wide and 178-μm-thick Nafion 117 (trade name, manufactured by Du Pont.) in a thickness of about 3 μm by chemical plating. The resultant composite material was impregnated with a water-repellent agent (FS-1010, manufactured by Fluoro Technology) for 16 hours, and then, drying and application of the water-repellent agent were repeated five times, to form a porous water-repellent layer. A part of the surface electrode was eliminated by laser processing, to produce a voltage applying part 10 mm in diameter at the center of the composite material.

Further, on the upper surface of the thus-obtained liquid flow control actuator of the present invention, two acryl resins of length 40 mm, width 5 mm and thickness 5 mm were arranged, to form a liquid passage between these acryl resins. The voltage applying part was positioned in the liquid passage. A glass pipe was disposed vertically to the plane of Nafion (trade name, manufactured by Du Pont.) at one end of that passage, to form a liquid supply part to supply a liquid to the passage. Before water was supplied to the liquid supply part, a voltage of −4.5 V was applied across the voltage applying part for 3 minutes. Water was supplied from the liquid supply part in that state. Water was permeated into the passage between the acryl resins from the liquid supply part, and was left in the voltage applying part. Water was left up to a height of about 3 cm in the glass pipe. After that, the voltage of the voltage applying part was changed to 2 V. Just then, foam on the water-repellent layer was washed away after about 3 minutes.

Example 5

A liquid actuator of the present invention which was provided with an electrode part disposed on one side thereof, as shown in FIG. 1-2 was produced, in the following manner. Platinum was provided to one surface of 40-mm-long, 115-mm-wide and 178-μm-thick Nafion 117 (trade name, manufactured by Du Pont.) in a thickness of about 3 μm by chemical plating. Specifically, two vessels were separated by Nafion (trade name, manufactured by Du Pont.), and then, a reducing solution was poured into only one of the water vessels and the other vessel was utilized as an air vessel, to provide platinum to only one surface. At that time, platinum was applied on almost the entire surface of the Nafion (trade name, manufactured by Du Pont.) film. A part of the electrode part to which platinum was applied was abraded linearly by using a glass knife, to form two electrode parts that were electrically separated or isolated and had a rectangular form (at that time, only the vicinity of the electrode part may be burned off by using a laser, to form the separated electrode parts). One electrode part had a size of length 20 mm and width 20 mm (hereinafter, this electrode part is referred to as an electrode part I). Another electrode part had a size of length 20 mm and width 5 mm (hereinafter, this electrode part is referred to as an electrode part II).

A water-repellent layer was provided on the upper surface of the electrode part I in the same manner as in Example 1. The film surface of Nafion (trade name, manufactured by Du Pont.) on the side opposite to the electrode part side was applied and fixed to a substrate. A terminal was set to each of the electrode parts I and II and connected to a power source in the same manner as in Example 1 (test form 5). The voltage to be applied to the electrode parts I and II was changed in the range of from −14 V to +14 V to adjust it, to thereby reversibly change the superficial wettability of the water-repellent layer of the electrode part I to control the same.

Then, the test form 5 produced above was placed in a chamber kept in high-humidity circumstance (at a constant temperature (60° C.) under a humidity of 95%), and a Peltier temperature device was laid under the test form to keep the test form at a constant temperature (25° C.), to coagulate liquid droplets on the water-repellent layer. The voltage to be applied across the electrode parts I and II was changed in the range from −14 V to +14 V to adjust it, thereby the diameter of the liquid droplet on the surface of the water-repellent layer of the electrode part I was increased, maintained as its size, or reduced the size.

INDUSTRIAL APPLICABILITY

According to the liquid actuator of the present invention, the size of a liquid droplet can be maintained and also, the size and shape of the liquid droplet can be changed reversibly and freely. Specifically, the liquid actuator of the present invention ensures that a liquid droplet can be appropriately controlled (for example, a liquid droplet is increased or decreased in size or cut to divide it under a high humidity) while avoiding thermal stimulation and preventing contamination of impurities. Thus, the liquid actuator of the present invention can be favorably used in the analysis of micro-liquid droplets and in chemical reactions using micro-liquid droplets (synthesis of a compound using micro-liquid droplets), in the fields of chemical production and bio-technologies.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body,
   wherein voltage is applied across the plural electrode parts including the one provided with the water-repellent layer, and the applied voltage is adjusted to change the superficial wettability of the structural body.

2. The liquid actuator according to claim 1, wherein one or more of the electrode parts are disposed on each side of the electrolyte layer, and voltage is applied across the electrode parts on both sides.

3. The liquid actuator according to claim 1, wherein the two or more of the electrode parts separated from each other are disposed on one side of the electrolyte layer, and voltage is applied across the electrode parts separated on the one side.

4. The liquid actuator according to claim 1, wherein, in accordance with adjustment of the voltage applied across the electrodes, the liquid contained in the structural body is permeated and exuded to the surface of the water-repellent layer to increase the superficial wettability of the structural body, or a liquid on the surface of the water-repellent layer is permeated and absorbed into the inside of the structural body to decrease the superficial wettability of the structural body.

5. The liquid actuator according to claim 1, wherein, in accordance with adjustment of the voltage applied across the electrodes, a liquid in the vicinity of the electrode part is electrolyzed to generate gas, and the generated gas is brought to the surface of the water-repellent layer to decrease the superficial wettability of the structural body.

6. The liquid actuator according to claim 1, wherein the superficial wettability of the water-repellent layer of the structural body is changed reversibly.

7. The liquid actuator according to claim 6, wherein an amount of the exuded liquid or absorbed liquid on the surface of the above water-repellent layer is increased or decreased in accordance with the voltage applied across the electrodes adjusted in a range of from −1.229 to 1.229 V, or an amount of the gas brought to the surface of the water-repellent layer is increased or decreased in accordance with the voltage applied across the electrodes in a range less than −1.229 V or exceeding 1.229 V; thereby the superficial wettability of the structural body is changed.

8. The liquid actuator according to claim 1, wherein the electrolyte is an organic electrolyte, an inorganic electrolyte, or an electrolyte of combination thereof.

9. The liquid actuator according to claim 1, wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

10. The liquid actuator according to claim 1, wherein the water-repellent layer contains at least one water-repellent agent selected from the group consisting of a paraffin-type water-repellent agent, a fluorine-containing water-repellent agent, and a silicon-type water-repellent agent.

11. The liquid actuator according to claim 1, wherein the electrode part is formed of gold, platinum, copper, carbon, or a combination thereof.

12. The liquid actuator according to claim 1, wherein a liquid-preservation layer is disposed on the electrolyte layer at the side opposite to the water-repellent layer.

13. The liquid actuator according to claim 1, wherein a contact angle of a droplet formed on the surface of the water-repellent layer is changed in a range from 90° to 150°.

14. A liquid flow control actuator using the liquid actuator according to claim 1, comprising: a liquid passage, and the liquid actuator provided in the manner that the water-repellent layer faces the inside of the liquid passage, wherein, in accordance with the voltage applied across the electrode parts, the superficial wettability of the structural body is decreased for preventing a liquid from intruding to shut the liquid flow in the passage, or said superficial wettability is increased to release the liquid flow.

15. The liquid flow control actuator according to claim 14, wherein the passage is a cylindrical passage or grooved passage.

16. A liquid formation control actuator, comprising the liquid actuator according to claim 1,
wherein two or more of the liquid actuator are provided independently, and the superficial wettability of the water-repellent layer is independently changed in the each region provided with the liquid actuator; or the electrode part of the liquid actuator is divided into plural regions with the water-repellent layer formed on the plurally divided electrode parts, and the superficial wettability of the water-repellent layers is independently changed in the each divided region; and thereby
a predetermined amount of the liquid is aggregated in a predetermined region.

17. A liquid distribution control actuator comprising the liquid formation control actuator according to claim 16, wherein the regions are disposed so as to be independently controllable.

18. A liquid distribution control actuator comprising the liquid formation control actuator according to claim 16, wherein the liquid formation control actuators are disposed in a predetermined arrangement on a substrate.

19. A liquid distribution control actuator comprising the liquid formation control actuator according to claim 16, wherein a liquid is formed in a predetermined regional distribution by using the liquid formation control actuator.

20. A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body,
wherein voltage is applied across the plural electrode parts including the one provided with the water-repellent layer, and the applied voltage is adjusted to change a liquid amount on the surface of the structural body.

21. The liquid actuator according to claim 20, wherein, in accordance with adjustment of the voltage applied across the electrodes, the liquid contained in the structural body is permeated and exuded to the surface of the water-repellent layer to increase the liquid amount on the surface of the structural body, or a liquid on the surface of the water-repellent layer is permeated and absorbed to decrease the liquid amount on the surface of the structural body.

22. The liquid actuator according to claim 20, wherein, in accordance with adjustment of the voltage applied across the electrodes, a liquid in the vicinity of the electrode part is electrolyzed to generate gas, and the generated gas is vaporized to decrease the liquid amount on the surface of the structural body.

23. The liquid actuator according to claim 20, wherein the liquid amount on the surface of the structural body is increased or decreased reversibly.

24. The liquid actuator according to claim 20, wherein the electrolyte is an organic electrolyte, an inorganic electrolyte, or an electrolyte of combination thereof.

25. The liquid actuator according to claim 20, wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

26. The liquid actuator according to claim 20, wherein the water-repellent layer contains at least one water-repellent agent selected from the group consisting of a paraffin-type water-repellent agent, a fluorine-containing water-repellent agent, and a silicon-type water-repellent agent.

27. The liquid actuator according to claim 20, wherein the electrode part is formed of gold, platinum, copper, carbon, or a combination thereof.

28. A liquid actuator, comprising: an electrolyte layer containing a liquid, two or more electrically separated electrode parts on one or both sides of the electrolyte layer, and a water-repellent layer having a porous structure on an outside surface of at least one of the electrode parts, in which the electrolyte layer, the electrode parts, and the water-repellent layer form a structural body, wherein voltage is applied across the plural electrode parts including the one provided with the water-repellent layer, and the applied voltage is adjusted to change a fluidity of a liquid formed on the surface of the structural body.

29. The liquid actuator according to claim 28, wherein, in accordance with adjustment of the voltage applied across the electrodes, the liquid contained in the structural body is permeated and exuded to the surface of the water-repellent layer to non-fluidize the liquid formed on the surface of the structural body, or a liquid on the surface of the water-repellent layer is permeated and absorbed to fluidize the liquid formed on the surface of the structural body.

30. The liquid actuator according to claim 28, wherein, in accordance with adjustment of the voltage applied across the electrodes, a liquid in the vicinity of the electrode part is electrolyzed to generate gas, and the generated gas is brought to the surface of the water-repellent layer to raise and fluidize the liquid formed on the surface of the structural body by a pressure of the gas.

31. The liquid actuator according to claim 28, wherein the fluidity of the liquid is changed reversibly.

32. The liquid actuator according to claim 28, wherein the electrolyte is an organic electrolyte, an inorganic electrolyte, or an electrolyte of combination thereof.

33. The liquid actuator according to claim 28, wherein the electrolyte is a polymer electrolyte having at least one group selected from the group consisting of a sulfonic acid group, a carboxyl group, a phosphoric acid group, a phosphonic acid group, a phosphinic acid group, a quaternary ammonium group, a tertiary amino group, a secondary amino group, and a primary amino group.

34. The liquid actuator according to claim 28, wherein the water-repellent layer contains at least one water-repellent agent selected from the group consisting of a paraffin-type water-repellent agent, a fluorine-containing water-repellent agent, and a silicon-type water-repellent agent.

35. The liquid actuator according to claim 28, wherein the electrode part is formed of gold, platinum, copper, carbon, or a combination thereof.

36. The liquid actuator according to claim 28, wherein the contact angle of a droplet formed on the surface of the water-repellent layer is changed in a range from 90° to 150°, to control the fluidity of the liquid.

37. A liquid droplet-mixing actuator using the liquid actuator according to claim 28, wherein plural liquid droplets, which are non-fluidized on the surface of the structural body by applying voltage, are fluidized by adjusting voltage, to allow these liquid droplets to bring into contact with and mix each other.

38. The liquid droplet-mixing actuator according to claim 37, wherein the liquid droplets are supplied from the outside of the actuator and formed.

* * * * *